United States Patent
Jain

(10) Patent No.: US 9,686,010 B2
(45) Date of Patent: Jun. 20, 2017

(54) SYSTEM AND METHOD FOR PROVIDING RESILIENCE IN COMMUNICATION NETWORKS

(71) Applicant: STERLITE NETWORKS LIMITED, Dadar Nagar Haveli (IN)

(72) Inventor: Vijay Jain, Banglore (IN)

(73) Assignee: STERLITE NETWORKS LIMITED, Silvassa, Dadar Nagar (IN)

(*) Notice: Subject to any disclaimer, the term of this patent is extended or adjusted under 35 U.S.C. 154(b) by 103 days.

(21) Appl. No.: 14/367,901

(22) PCT Filed: Dec. 20, 2012

(86) PCT No.: PCT/IB2012/057535
§ 371 (c)(1),
(2) Date: Jun. 21, 2014

(87) PCT Pub. No.: WO2013/093838
PCT Pub. Date: Jun. 27, 2013

(65) Prior Publication Data
US 2015/0037033 A1 Feb. 5, 2015

(30) Foreign Application Priority Data

Dec. 22, 2011 (IN) .......................... 3616/MUM/2011

(51) Int. Cl.
*H04B 10/03* (2013.01)
*H04Q 11/00* (2006.01)
*H04B 10/11* (2013.01)
*H04B 10/27* (2013.01)
*H04B 10/112* (2013.01)
(Continued)

(52) U.S. Cl.
CPC ............. *H04B 10/03* (2013.01); *H04B 10/11* (2013.01); *H04B 10/112* (2013.01); *H04B 10/27* (2013.01); *H04B 10/272* (2013.01); *H04Q 11/0067* (2013.01); *H04J 14/0282* (2013.01); *H04Q 2011/0081* (2013.01)

(58) Field of Classification Search
None
See application file for complete search history.

(56) References Cited

U.S. PATENT DOCUMENTS

| | | |
|---|---|---|
| 2003/0117998 A1 | 6/2003 | Sala et al. |
| 2004/0004538 A1* | 1/2004 | Manis ..................... H04B 3/54 725/130 |
| 2007/0065078 A1 | 3/2007 | Jiang |

(Continued)

*Primary Examiner* — Darren E Wolf

(57) ABSTRACT

A system (100) for providing resilience in a communication network capable of providing multiple services to multiple customers. The system (100) includes at least one Optical Line Terminal (OLT) (110), and at least one Passive Optical Network (PON) based architecture (115) operably coupled to the at least one OLT (110). The PON based architecture (115) includes at least one down link mechanism (120) operably coupled to the at least one OLT (110). The down link mechanism (120) is capable of transporting optical signals generated by the OLT (110) downstream to users end via the PON based architecture (115) and includes at least one Free Space Optics (FSO) Link (130) configured to operate in a continuous mode both during up linking and down linking. The down link mechanism (120) provides the resilience in the communication network.

9 Claims, 5 Drawing Sheets

(51) Int. Cl.
*H04B 10/272* (2013.01)
*H04J 14/02* (2006.01)

(56) References Cited

U.S. PATENT DOCUMENTS

2010/0150566 A1 6/2010 Soto et al.
2011/0026922 A1 2/2011 Ota et al.
2011/0142443 A1 6/2011 Hirth et al.

\* cited by examiner

SYSTEM AND METHOD FOR PROVIDING RESILIENCE IN COMMUNICATION NETWORKS

TECHNICAL FIELD

This invention relates to optical networks, and more particularly, to an improved technique for providing resilience in communication networks, such as passive optical networks

BACKGROUND ART

Optical networks, such as Passive optical networks (PONs) and Ethernet passive optical networks (EPON), are commonly used in the present world for providing a variety of services, like telephony, cable television and internet, simultaneously to subscribers. A typical PON consists of an Optical line termination (OLT) at a service provider's office and a number of Optical Network Units (ONTs) near end users. The ONTs de-multiplex the optical signal received from the service provider into its various components, viz. telephony, cable television and data. The optical signal is transmitted to the ONTs through a fibre optic cable while the demultiplexed component signals from the ONTs are transmitted to the subscriber's home devices by using various output cables, such as CAT 6, RJ-11 and the like, corresponding to the type of component signals.

In this manner, PON provides for an efficient and quick mechanism of giving variety of services to subscribers. Accordingly, there is a constant need for improving the existing PONs to take such means of communications to higher and much faster level.

More specifically, it has been noted that over the years, no media other than the Optical Fibre Cable (OFC) has been successfully used for increasing the resiliency of optical networks. Network resilience is an important requirement so as to provide and maintain an acceptable level of service when faults occur in the network. Thus, network resilience means the capability of the communication network to be fault tolerant. Therefore, there is a need to increase the resilience of the optical networks, especially PON networks.

Generally, in conventional PONs, network resiliency at the time of breakdown of the backbone optical path is provided by backup optical fiber cables. However, such technique is not very reliable since the backup optical fiber cables may also break down thereby resulting in no resiliency at all. Also, at times it is difficult to lay optical fiber cables and thus it is difficult to ensure network resiliency.

A recent advancement in the field of communication is the improvement in practical applications of Free Space Optics (FSO) communication. It will be apparent to a person skilled in the art that FSO communication is a line-of-sight communication, which uses invisible beams of light to provide optical bandwidth connections. FSO communication has been tested to be capable of delivering multiple (1.25/2.5/10)Gigabytes per second (Gbps) of data, voice, and video communications simultaneously through the most available medium, i.e., air. The FSO communication, therefore, enables fibre optic connectivity without actually requiring physical fibre optic cables. Further, the communication is fast—at the speed of light, and apart from few practical issues, is easy to deploy and use. Therefore, there is an imperative need of integrating FSO based communication in the PONs, thereby providing faster, reliable and higher throughput communication solutions.

SUMMARY OF INVENTION

In view of the foregoing disadvantages inherent in the prior art, the general objective of the present invention is to increase the resiliency of optical networks, especially PON networks.

Another objective of the present invention is to use an alternate medium to OFC for transferring multiple services to subscribers especially when OFC laying because of ROW permissions etc is a big issue.

Yet another objective of the present invention is to provide solutions that fulfil customer expectations from the service providers for providing faster and efficient services.

Yet another object of the present invention is to provide a method for enabling better network resiliency in a PON.

These and other objects and advantages of the invention will be clear from the ensuing description.

In light of the above objects, a system and method for providing resilience in a communication network capable of providing multiple services to multiple customers is disclosed.

The present invention provides a system for providing resilience in a communication network capable of providing multiple services to multiple customers. The system includes at least one Optical Line Terminal (OLT). Further, the system includes at least one Passive Optical Network (PON) based architecture operably coupled to the at least one OLT, wherein the at least one PON based architecture includes at least one down link mechanism operably coupled to the at least one OLT, wherein the at least one down link mechanism is capable of transporting optical signals generated by the OLT downstream to users end via the PON based architecture. In one embodiment, the at least one down link mechanism comprises at least one Free Space Optics (FSO) Link configured to operate in a continuous mode both during up linking and down linking, and wherein the at least one down link mechanism provides the resilience in the communication network.

In another aspect, the present invention relates to a method for providing resilience in a communication network capable of providing multiple services to multiple customers. The method includes providing at least one Optical Line Terminal (OLT). Further, the method includes providing at least one Passive Optical Network (PON) based architecture for transporting the signals generated at the OLT to the users. The at least one Passive Optical Network (PON) based architecture includes at least one down link mechanism operably coupled to the at least one OLT. The at least one down link mechanism is capable of transporting optical signals generated by the OLT (110) to users' end, and includes at least one Free Space Optics (FSO) Link configured to operate in a continuous mode both during up linking and down linking. The provisioning of the services generated by the OLT to users' end via the at least one Passive Optical Network (PON) based architecture provides resilience in the communication network.

This together with the other aspects of the present invention along with the various features of novelty that characterized the present disclosure is pointed out with particularity in claims annexed hereto and forms a part of the present invention. For better understanding of the present disclosure, its operating advantages, and the specified object attained by its uses, reference should be made to the accompanying descriptive matter in which there are illustrated exemplary embodiments of the present invention.

BRIEF DESCRIPTION OF THE DISCLOSURE

The advantages and features of the present invention will become better understood with reference to the following detailed description and claims taken in conjunction with the accompanying drawings, in which:

Figure 3:
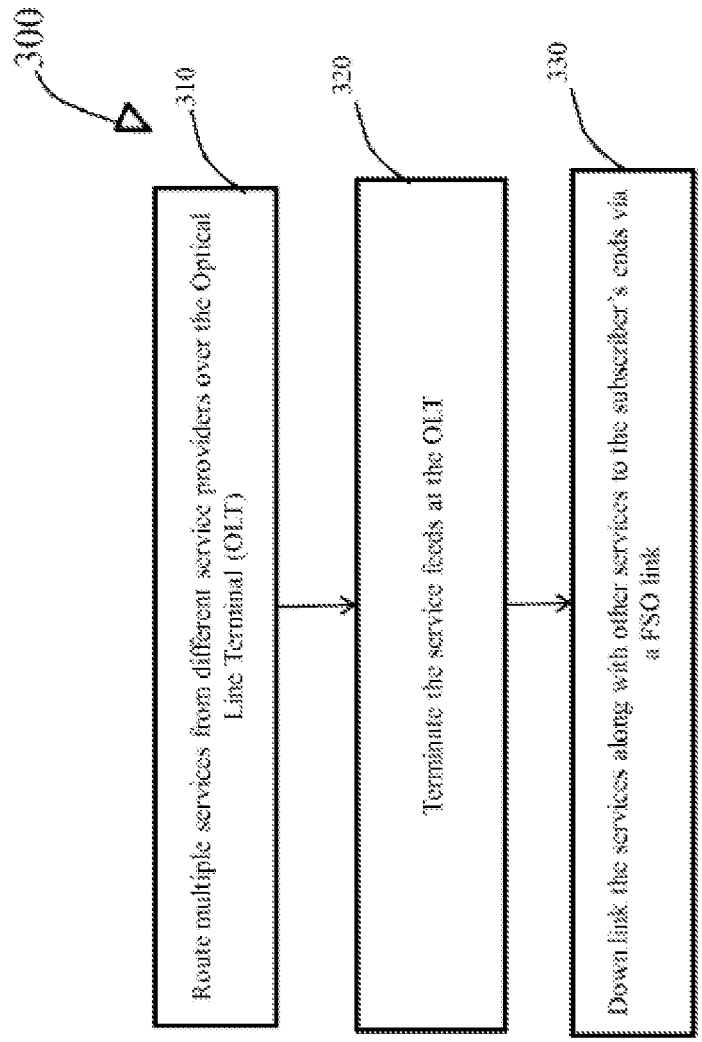
Figure 4:
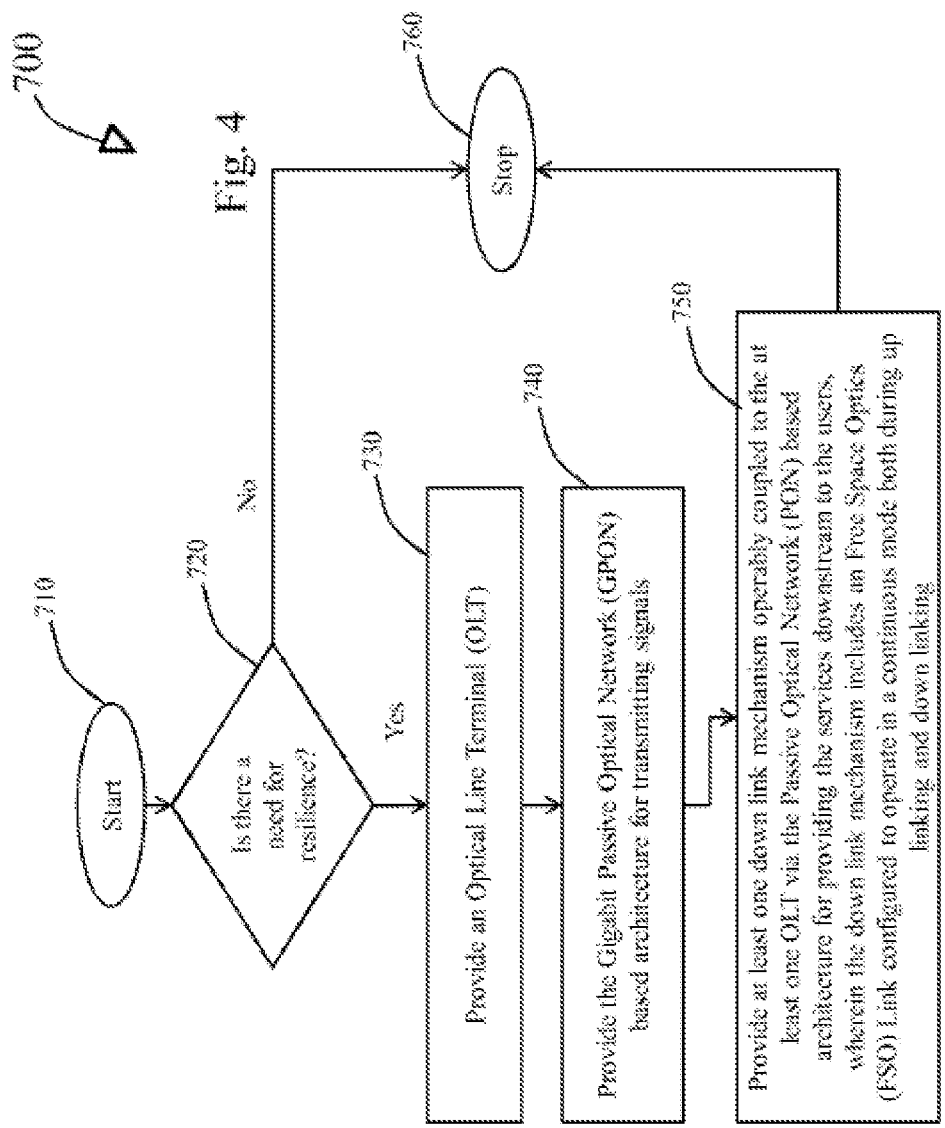

FIG. 3 illustrates a block diagram of a method for providing resilience in a communication network, such as an PON based point to point data network, according to an embodiment of the present invention; and FIG. 4 illustrates a flow diagram of a method for providing resilience in a communication network, such as PON based point to point data network, according to an embodiment of the present invention.

Figure 5:
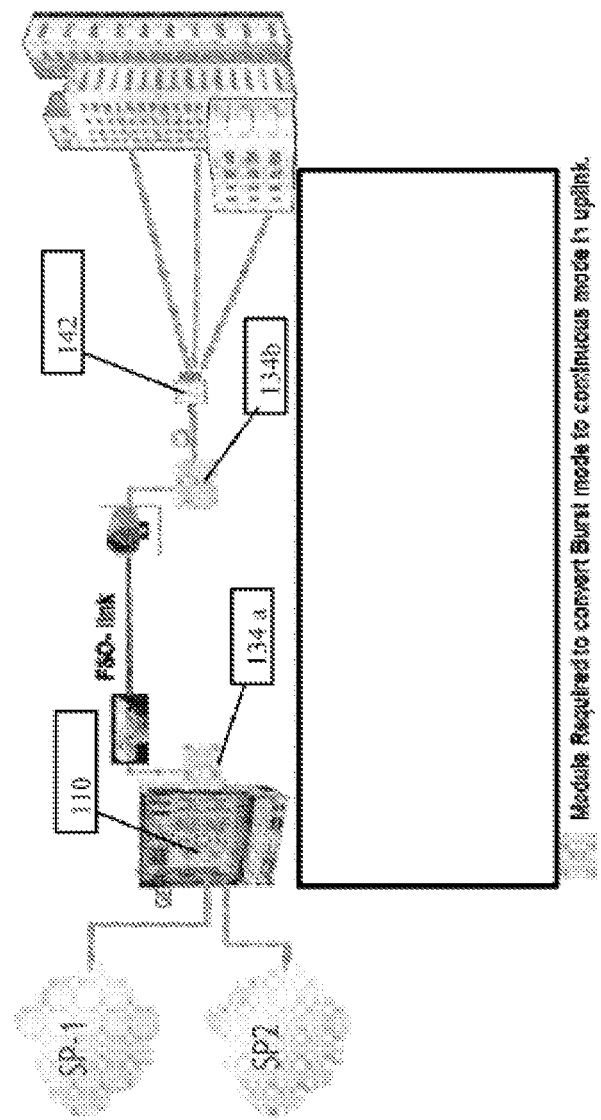

FIG. 5 illustrates schematic representation of the system 100 for providing resilience in a communication network, wherein the system 100 includes modulators, according to an embodiment of the present invention.

Like numerals represent like components throughout the description section.

DETAILED DESCRIPTION OF THE DISCLOSURE

For a thorough understanding of the present disclosure, reference is to be made to the following detailed description, including the appended claims. Although the present disclosure is described in connection with exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting.

The terms "a" and "an" herein do not denote a limitation of quantity, but rather denote the presence of at least one of the referenced item.

The terms "having", "comprising", "including", and variations thereof signify the presence of a component.

The present invention provides systems and methods for providing better network resiliency in a communication network capable of providing multiple services from multiple service providers to the subscribers. In nutshell, the system includes at least one Optical Line Terminal (OLT), and at least one Passive Optical Network (PON) based architecture operably coupled to the at least one OLT. The PON based architecture includes at least one down link mechanism operably coupled to the at least one OLT. The down link mechanism is capable of transporting optical signals generated by the OLT downstream to users end via the PON based architecture and includes at least one Free Space Optics (FSO) Link configured to operate in a continuous mode both during up linking and down linking. The down link mechanism provides the resilience in the communication network.

It will be apparent to a person skilled in the art that the term 'communication network' as used herein refers to an arrangement of various devices in a specific configuration so as to enable transfer of voice, data or any other content between a user(s) or a service provider at one end and another user(s) at a remote end. Specifically, the communication network as mentioned herein refers to a network for providing multiple services to multiple users. Further, it should be understood that though, the present invention is shown to be applicable in a particular optical network configuration, such as a Passive Optical Network (PON), such explanation should not be construed as a limitation to the present invention. Accordingly, the method and systems disclosed may be equally applicable in any communication network whether point to point or point to multipoint, and running on any configuration or data transfer protocols, such as BPON (ATM-based Broadband PON), GPON (Gigabit PON), EPON (Ethernet PON), or in general XPON or XGPON or XEPON, and the like.

Further, the term 'multiple services' as mentioned herein include, but are not limited to, telephony, cable television, IP based services, such as internet services, VoIP services, and the like. It will be apparent to a person skilled in the art that the term 'subscribers' as mentioned herein refers to users of aforesaid services. The term 'resiliency' as mentioned herein means the capability of the network to be fault tolerant. In other words, the systems and methods improve the redundancy or fault tolerance of the communication network. The systems and methods will now be explained in conjunction with FIGS. 1-5 as below.

Figure 1:
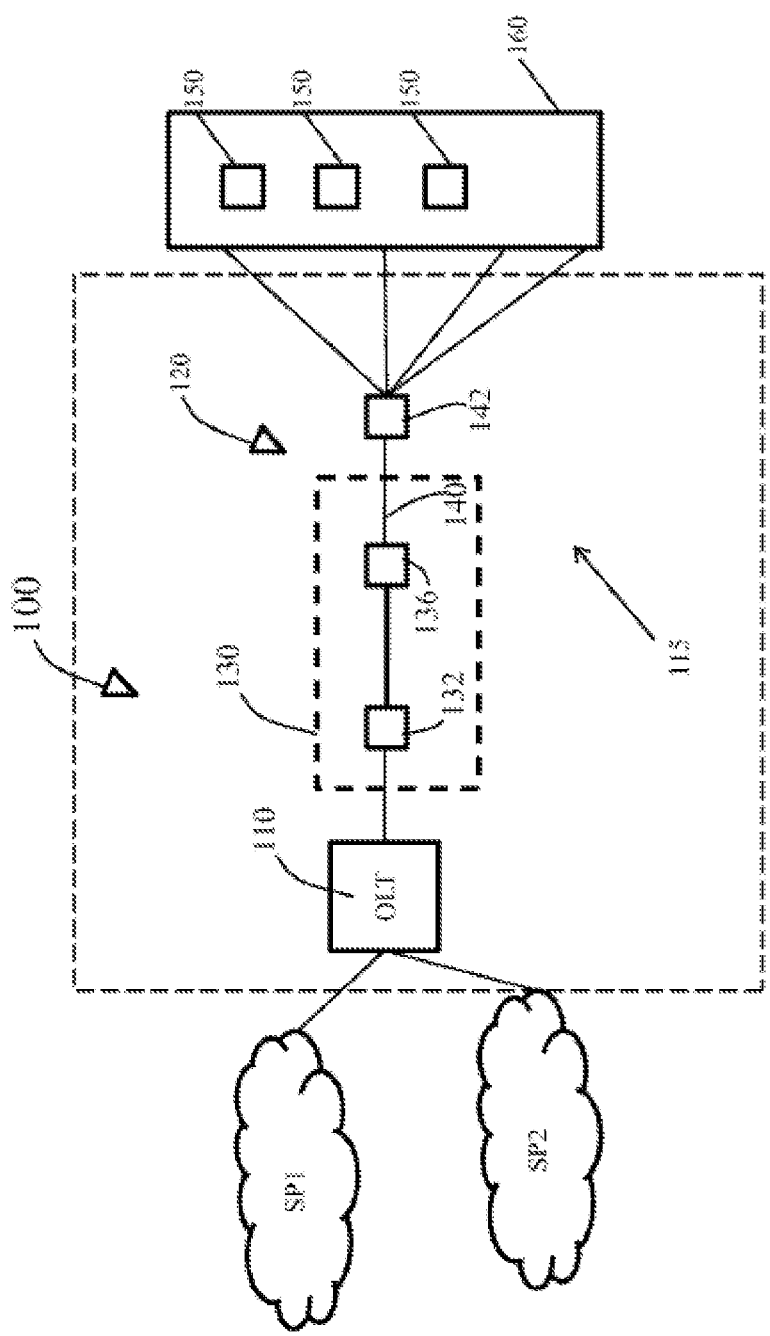
FIG. 1 illustrates a block diagram of a system 100 for providing resilience in a communication network, such as an PON based point to point data network, according to an embodiment of the present invention.
Figure 2:
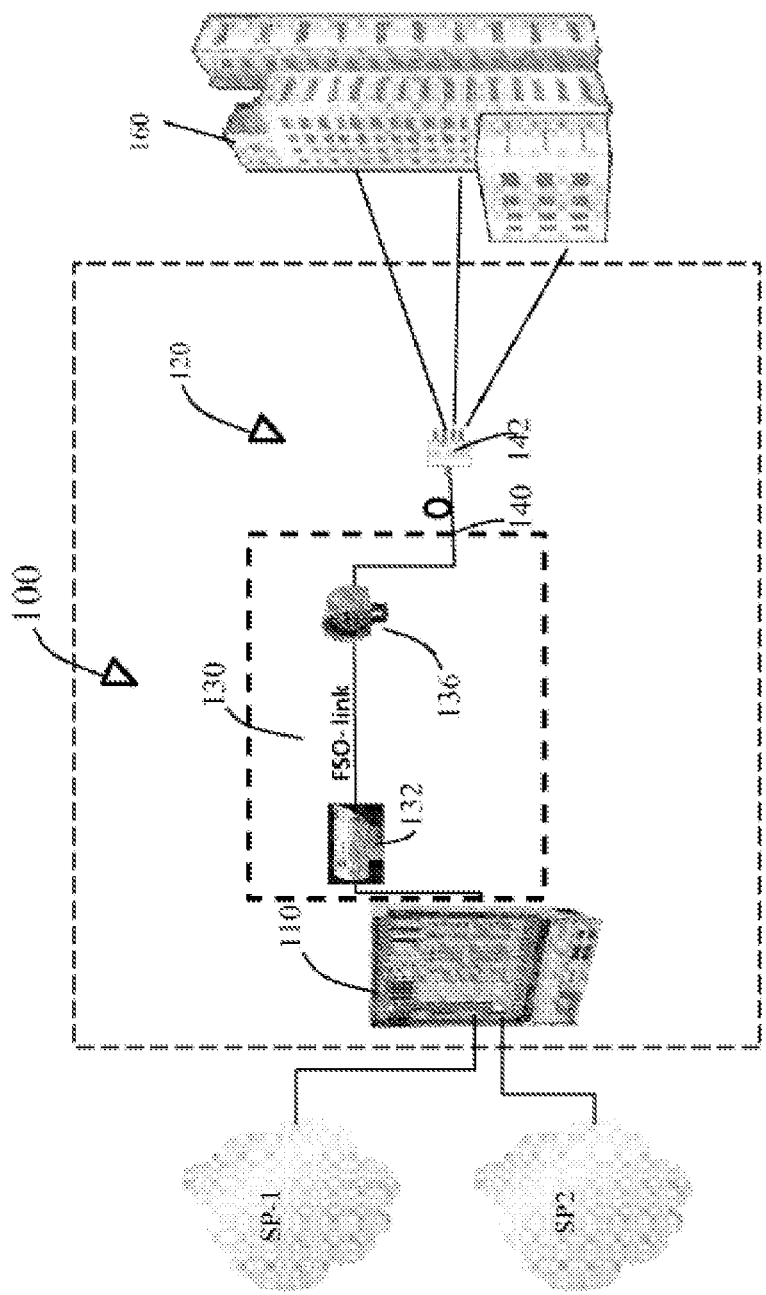
FIG. 2 illustrates schematic representation of the system 100 of FIG. 1, according to an embodiment of the present invention.

As depicted in FIGS. 1-2 and 5, a system 100 for providing better network resiliency in a communication network is shown, in accordance with one embodiment of the present invention. The system 100 includes at least one Optical Line Terminal (OLT) 110. The OLT 110 is configured to act as an end point for terminating the feed provided by various services, such as service provider SP 1 and service provider SP 2, to whom the OLT 110 is operably coupled via wired or wireless means. It will be apparent to persons skilled in the art that the wired or wireless means may operate on any standard data and content exchange protocols for enabling the transfer of data, content or services from the service providers SP1, SP2 and the OLT 110.

More specifically, the OLT 110 may be configured to perform conversion of the electrical or optical signals used by the service providers feeds into fiber optic signals, which will be used further in the system 100. Furthermore, the OLT 110 may be configured to coordinate the multiplexing between the various optical signals generated by the OLT 110 and may operate on any known in the art protocols. It will be apparent to the person skilled in the art that the OLT 110 employed in the system 100 is similar to the OLTs known in the art, but, adapted to perform aforesaid functions.

The system 100 further includes at least one Passive Optical Network (PON) based architecture 115 having a down link mechanism 120, which is operably coupled to the OLT 110 for transporting of the optical signals downstream to the users. In one embodiment, the down link mechanism 120 is similar to a Passive Optical Network (PON) based architecture; however, it may include a Free Space Optics (FSO) link 130 operably coupled to the OLT 110. It will be apparent to persons skilled in the art that the FSO link 130 is a line-of-sight communication using invisible beams of light to provide optical bandwidth connections. The operational coupling between the OLT 110 and the FSO-link 130 is provided using known in the art optical means, such as fibre optical cables, and the like.

In one embodiment, the FSO link 130 may include various optical wireless units, such as an optical transceiver 132 operably coupled to the OLT 110 and another optical transceiver 136 connected to the users end. It will be apparent to a person skilled in the art that each of the optical transceivers 132 and 136 includes a transmitter (not shown) and a receiver (not shown) to provide full-duplex (bi-directional) capability. Each optical wireless unit may employ an optical source, plus a lens or telescope that transmits light through the atmosphere to another lens receiving the information. At this point, the receiving lens or telescope connects to a high-sensitivity receiver via optical fibre 140 for further transmission of the received signals. Therefore, FSO link 130 acts as a carrier for transferring the traffic from multiple wavelengths used for the data transfer for example in wavelengths, such as 1310 nanometre (nm) and 1490 nanometre (nm), and the like. Further, the FSO link 130 is inherently adapted to support multiple technologies that are used in optical transmissions, such as Ethernet, PON, Fibre Channel (FC), SDH, SONET, and the like.

Now referring again to the description of the down link mechanism 120, the down link mechanism 120 includes a typically conventional optical back bone having one or more splitters 142 (only one splitter 142 shown in the FIGS. 1-2) operably coupled to the optical transceiver 136 of the FSO link 130 via optical fibre, such as optical fibre 140. The one or more splitters 142 are configured to divide the optical signals generated and transmitted by the OLT 110 and collected at the optical transceiver 136 into various sub signals, which may be then fed to Optical Network Terminals (ONTs) 150 kept at subscriber's ends in an installation 160.

In one embodiment, the one or more splitters 142 are 1, 2×N splitter, where N=1, 2, 4, 8, 16, 32, 64, 128. In another embodiment, the one or more splitters 142 are 2:N splitters. However, it should be clearly understood that aforementioned examples of the one or more splitters 142 should not be in any ways be construed as a limitation to the present invention. Accordingly, any other combinational splitter capable of performing functions similar to aforesaid functions of the one or more splitters 142 may also be employed in the system 100.

The functionality of FSO link 130 as part of the present invention will now be described in details.

In one embodiment, in the FSO link 130, the working signals operate on a continuous mode both during up linking and down linking. Conventionally, in FSO links, the downlink signal from OLT 110 to ONTs 150 is in a broadcast mode, which is a continuous mode. However, the upstream signal from ONTs 150 to OLT 110 is based on a Time Division Multiplexing (TDM) mode, which is typically a non-continuous or burst mode. Such operation of the conventional FSO link faces a challenge in transmitting the signal upstream, or specifically from the splitter 142 to the OLT 110.

To solve this challenge, the FSO link 130 works on a continuous mode during both the up linking and down linking. Such working of the FSO link 130 is provided by employing modulators 134 (i.e., first modulator 134*a* and second modulator 134*b*) configured to convert the burst mode signals into the continuous mode signals and vice versa, as shown in FIG. 5. Referring to the FIG. 5, the first modulator 134*a*, connected to the OLT 110 coupled to the first optical transceiver 132, receives and convert the signal (i.e., optical signals) in the burst mode into the continuous mode during the down linking. And, the second modulator 134*a*, connected to the ONTs 150 coupled to the second optical transceiver 136, receives and convert the signal in the burst mode into the continuous mode during the up linking. Thus, the first optical transceiver 132 and the second optical transceiver 136 transmit the signals in the continuous mode by way of the FSO link 130. For this purpose, any known in the art modulators may be configured to perform aforesaid functions. Further, in the FSO link 130, the wavelength of working signals used has wavelengths in ranges excluding 20 nanometres and 850 nanometres. However, it should be clearly understood that such wavelength exclusion of the FSO link 130 should not be in any ways construed as a limitation to the present disclosure.

In one embodiment, the FSO Link 130 is adapted such that the packet size is varied for the conversion from the burst mode to the continuous mode. This ensures that all ONT's send the data in a continuous mode without any bursts.

In another aspect, as shown in FIG. 3, the present invention provides a method 300 for providing multiple services to subscriber's premises. The method initiates at block 310. At block 310, multiple services from different service providers are routed over the OLT, such as OLT 110. After the routing of the services at block 310, the method 300 includes terminating the service feeds at the OLT, at block 320. Thereafter, the method 300 includes down linking the services to the subscriber's ends using an FSO link, such as FSO link 130, in accordance with the down linking as explained with reference to FIGS. 1-2. In one embodiment, the down linking may be provided such that the FSO link 130 operates on a continuous mode both during up linking and down linking.

In another aspect, the present invention provides a method 700 for providing resilience in a communication network capable of providing multiple services to multiple customers, as shown in FIG. 4. The method 700 initiates at step 710. Step 720 is a decision box, where the method 700 checks for the need for resilience in the communication network. If there is a need for resilience, the method 700 moves to step 730. At step 730, the method 700 includes providing at least one Optical Line Terminal (OLT). In one embodiment, the OLT is configured to terminate multiple services provided by multiple service providers in the communication network thereon at the at least one OLT, aggregate the terminated services at the at least one OLT, and convert the aggregated services into optical signals at the at least one OLT. Thereafter, the method 700 flows to step 740.

At step 740, the method 700 includes providing at least one Passive Optical Network (GPON) based architecture operably coupled to the at least one OLT. In one embodiment, the PON based architecture includes a down linking mechanism 120, wherein the down linking mechanism 120 includes the FSO Link 130 configured to work in a continuous mode both during up linking and down linking.

After step 730, the method 700 flows to step 750. Thereafter, at step 750, the method 700 includes providing at least one down link mechanism operably coupled to the at least one OLT via PON based architecture for providing the services downstream to the users. In one embodiment, the at least one down link mechanism is capable of transporting optical signals generated by the OLT downstream to users' end, and the at least one down link mechanism includes at least one Free Space Optics (FSO) Link configured to operate in a continuous mode both during up linking and down linking. Thereafter, the method 700 moves to step 760, where it terminates.

In this manner, the system 100 and the method of the present invention is capable of providing faster, reliable and higher throughput communication solution to the subscribers. Further, by ensuring faster, reliable and higher throughput communication solution, the system 100 is capable of providing better commitments to the end subscribers. For example, the system 100 is capable of providing 130 speeds for the uplink as well as downlink. The rates can vary from few kilo bytes per second (kbps) to 100-1000 Gigabytes as well as Terabytes. Furthermore, the system 100 acts as an alternative optical network, which can provide as an alternative means to supply multiple services to subscribers, especially when OFC laying because of ROW permissions etc is a big issue.

Further, the present invention should not be construed to be limited to the configuration of the system 100 as described herein only. Various configurations of the system are possible which shall also lie within the scope of the present invention.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

I claim:

1. A system (100) for providing fault tolerance in a communication network capable of providing multiple services, the system (100) comprising:
   at least one Optical Line Terminal (OLT) (110) to receive the multiple services and generate optical signals; and
   at least one Free Space Optics (FSO) link (130) comprising:
      a first optical transceiver (132) coupled to the at least one OLT (110) to receive the optical signals and transmit the optical signals, and
      a second optical transceiver (136) that communicates with the first optical transceiver (132) by way of the at least one FSO link (130) to receive the optical signals and transport the optical signals to at least one Optical Network Terminal (ONT) (150), wherein the at least one FSO Link (130) comprises a first modulator (134a) and a second modulator (134b), wherein the first modulator (134a) is connected to the first optical transceiver (132), wherein the first modulator (134a) is configured to convert the optical signals in a burst mode to the optical signals in a continuous mode during up linking and a second modulator (134b) is connected to the second optical transceiver (136), wherein the second modulator (134b) is configured to convert the optical signals in a burst mode to the optical signals in a continuous mode during down linking, and wherein the at least one FSO Link (130) provides the fault tolerance in the communication network.

2. The system (100) of claim 1, wherein the at least one OLT (110):
   receives the multiple services from multiple service providers;
   terminates the multiple services;
   aggregates the multiple services;
   converts the multiple services to generate the optical signals ;and
   transport the optical signals in the continuous mode, in the down linking by way of the at least one FSO link (130), to the at least one ONT (150).

3. The system (100) of claim 1, wherein the at least one FSO Link (130) supports at least one of Ethernet, PON, Fibre Channel (FC), SDH, SONET, or a combination thereof.

4. A method for providing fault tolerance in a communication network capable of providing multiple services, the method comprising:
   receiving the multiple services by at least one Optical Line Terminal (OLT) (110), wherein the multiple services are provided by multiple service providers;
   generating optical signals by the at least one OLT (110);
   providing at least one Free Space Optics (FSO) Link (130);
   transmitting the optical signals by a first optical transceiver (132) of the at least one FSO Link (130);
   receiving the optical signals by a second optical transceiver (136) of the at least one FSO Link (130), wherein the second optical transceiver (136) communicates with the first optical transceiver (132) by way of the at least one FSO link (130); and
   transporting the optical signals by the second optical transceiver (136), wherein the at least one FSO Link (130) comprises a first modulator (134a) and a second modulator (134b), wherein the first modulator (134a) is connected to the first optical transceiver (132), wherein the first modulator (134a) is configured to convert the optical signals in a burst mode to the optical signals in a continuous mode during up linking and a second modulator (134b) is connected to the second optical transceiver (136), wherein the second modulator (134b) is configured to convert the optical signals in a burst mode to the optical signals in a continuous mode during down linking, and wherein the at least one FSO Link (130) provides the fault tolerance in the communication network.

5. The method of claim 4, comprising:
   terminating the multiple services by the at least one OLT (110);
   aggregating the multiple services by the at least one OLT (110);
   converting the multiple services to generate the optical signals by the at least one OLT (110);
   transport the optical signals in the continuous mode, in the down linking by way of the at least one FSO link (130), to the at least one ONT (150).

6. The method of claim 4, further comprising:
   receiving the optical signals by one or more splitters (142) from the at least one FSO Link (130);
   dividing the optical signals by the one or more splitters (142); and
   generating sub signals by the one or more splitters (142).

7. A system (100) for providing fault tolerance in a communication network capable of providing multiple services, the system (100) comprising:

at least one Optical Line Terminal (OLT) (110) to receive the multiple services and generate optical signals;

at least one Free Space Optics (FSO) Link (130) comprising:

a first optical transceiver (132) coupled to the at least one OLT (110) to receive the optical signals in a continuous mode and transmit the optical signals;

a second optical transceiver (136) that communicates with the first optical transceiver (132) by way of, the at least one FSO link (130) to receive the optical signals in the continuous mode and transport the optical signals in the continuous mode, to at least one Optical Network Terminals (ONTs) (150), wherein the at least one FSO Link (130) comprises a first modulator (134*a*) and a second modulator (134*b*), wherein the first modulator (134*a*) is connected to the first optical transceiver (132), wherein the first modulator (134*a*) is configured to convert the optical signals in a burst mode to the optical signals in a continuous mode during up linking and a second modulator (134*b*) is connected to the second optical transceiver (136), wherein the second modulator (134*b*) is configured to convert the optical signals in a burst mode to the optical signals in a continuous mode during down linking, and wherein the at least one FSO Link (130) provides the fault tolerance in the communication network; and one or more splitters (142) coupled to the second optical transceiver (136) to receive the optical signals, divide the optical signals, and generate subsignals.

8. The system (100) of claim 7, wherein the at least one OLT (110):

receives the multiple services from multiple service providers;

terminates the multiple services;

aggregates the multiple services;

converts the multiple services to generate the optical signals; and transport the optical signals in the continuous mode, in the down linking by way of the at least one FSO link (130), to the at least one ONT (150).

9. The system (100) of claim 7, wherein the at least one FSO Link (130) supports at least one of Ethernet, PON, Fibre Channel (FC), SDH, SONET, or a combination thereof.

* * * * *